(12) United States Patent
Jin et al.

(10) Patent No.: US 11,066,082 B2
(45) Date of Patent: Jul. 20, 2021

(54) CANCEL POINT MANAGEMENT SYSTEM, CANCEL POINT NOTIFICATION SYSTEM, CANCEL POINT GUIDE SYSTEM, AND NON-TRANSITORY COMPUTER-READABLE STORAGE MEDIUM

(71) Applicant: TOYOTA JIDOSHA KABUSHIKI KAISHA, Toyota (JP)

(72) Inventors: Xin Jin, Nagoya (JP); Hironobu Sugimoto, Nagoya (JP); Hiroaki Sakakibara, Nagoya (JP); Shingo Kinashi, Okazaki (JP); Kazuteru Maekawa, Miyoshi (JP); Sadahiro Koshiba, Takahama (JP); Takahiro Yamaguchi, Okazaki (JP); Yuji Sato, Owariasahi (JP); Seiji Takahata, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 16/047,242

(22) Filed: Jul. 27, 2018

(65) Prior Publication Data

US 2019/0061783 A1  Feb. 28, 2019

(30) Foreign Application Priority Data

Aug. 22, 2017 (JP) .............................. JP2017-159242

(51) Int. Cl.
*B60W 50/14* (2020.01)
*G08G 1/01* (2006.01)
(Continued)

(52) U.S. Cl.
CPC ............ *B60W 50/14* (2013.01); *B60W 60/00* (2020.02); *G08G 1/0129* (2013.01);
(Continued)

(58) Field of Classification Search
CPC .. G08G 1/0133; G08G 1/0129; G08G 1/0112; G08G 1/096775; G08G 1/0141;
(Continued)

(56) References Cited

U.S. PATENT DOCUMENTS 10,252,726 B2 * 4/2019 Emura .................. B60W 40/09
2005/0225744 A1 * 10/2005 Samukawa ........ G06K 9/00805
356/28

(Continued)

FOREIGN PATENT DOCUMENTS

JP  2011-118603 A  6/2011
JP  2015-141478 A  8/2015
(Continued)

OTHER PUBLICATIONS

H∞ Robust Control Based on Internal Model Theory for Linear Permanent Magnet Synchronous Motor; Zhao Ximei;Guo Qingding; 2005 International Conference on Electrical Machines and Systems; Year: 2005; vol. 2; IEEE Conference Paper. (Year: 2005).*

(Continued)

*Primary Examiner* — Cuong H Nguyen
(74) *Attorney, Agent, or Firm* — Sughrue Mion, PLLC (57) ABSTRACT

This invention provides technology that can provide a driver with an opportunity to decide whether or not to continue automatic drive control. A cancel point management system includes a cancel point collector that collects first notification information, indicating a manual cancel point which is a point where automatic drive control has been cancelled in response to operation by a driver in a notification vehicle, from the notification vehicle and a guide information distributer that distributes first guide information for showing the manual cancel point to a guide vehicle traveling on a road.

6 Claims, 3 Drawing Sheets

(51) Int. Cl.
*G08G 1/0967* (2006.01)
*B60W 60/00* (2020.01)
*G01C 21/34* (2006.01)
*G01C 21/36* (2006.01)

(52) U.S. Cl.
CPC ..... *G08G 1/0141* (2013.01); *G08G 1/096775* (2013.01); *G01C 21/3407* (2013.01); *G01C 21/36* (2013.01); *G08G 1/096716* (2013.01)

(58) Field of Classification Search
CPC .......... G08G 1/096716; G01C 21/3655; G01C 21/3407; G01C 21/3697; B60W 50/14; B60W 60/00; G07C 5/008; G05D 1/006
USPC ............................................. 701/41, 532–533
See application file for complete search history.

(56) References Cited

U.S. PATENT DOCUMENTS

| | | | | |
|---|---|---|---|---|
| 2008/0275636 | A1* | 11/2008 | Hirose | G08G 1/096827 701/533 |
| 2011/0225417 | A1* | 9/2011 | Maharajh | H04L 65/4076 713/150 |
| 2018/0093676 | A1* | 4/2018 | Emura | G05D 1/0257 |
| 2018/0329414 | A1* | 11/2018 | Igarashi | G08G 1/16 |
| 2019/0004513 | A1* | 1/2019 | Chiba | B60T 7/22 |
| 2019/0168772 | A1* | 6/2019 | Emura | B60W 50/10 |
| 2019/0344790 | A1* | 11/2019 | Kitagawa | G05D 1/0061 |
| 2019/0359227 | A1* | 11/2019 | Otaki | B60W 30/181 |
| 2020/0079393 | A1* | 3/2020 | Hasegawa | G05D 1/0061 |
| 2020/0225655 | A1* | 7/2020 | Cella | G05B 19/41875 |
| 2020/0264606 | A1* | 8/2020 | Kuwahara | B60W 60/007 |
| 2020/0348662 | A1* | 11/2020 | Cella | G05B 23/0286 |

FOREIGN PATENT DOCUMENTS

| | | | | |
|---|---|---|---|---|
| JP | 2016-207063 A | | 12/2016 | |
| WO | WO-2016170764 A1 | * | 10/2016 | ............. B60K 35/00 |

OTHER PUBLICATIONS

Driver-compatible steering system for wide speed-range path following; Y. Hayakawa;R. White;T. Kimura;G. Naito; IEEE/ASME Transactions on Mechatronics; Year: 2004; vol. 9, Issue: 3; IEEE Journal Article. (Year: 2004).*

Compensation of Complex Hysteresis and Creep Effects in Piezoelectrically Actuated Systems—A New Preisach Modeling Approach; Klaus Kuhnen; Pavel Krejci; IEEE Transactions on Automatic Control; Year: 2009; vol. 54, Issue: 3; Journal Article; Publisher: IEEE. (Year: 2009).*

Notification of Reasons for Refusal dated Mar. 9, 2021 from the Japanese Patent Office in Application No. 2017-159242.

* cited by examiner

CANCEL POINT MANAGEMENT SYSTEM, CANCEL POINT NOTIFICATION SYSTEM, CANCEL POINT GUIDE SYSTEM, AND NON-TRANSITORY COMPUTER-READABLE STORAGE MEDIUM

BACKGROUND

1. Technical Field

The present invention relates to a cancel point management system, a cancel point notification system, a cancel point guide system, and a non-transitory computer readable storage medium storing a cancel point management program.

2. Related Art

There is known a technique of prohibiting automatic driving control or providing information to a driver when a vehicle approaches a point where position detection accuracy reaches equal to or less than a predetermined value (refer to No. 2011-118603 A). As a result, the driver can know in advance a point where the position detection accuracy reaches equal to or less than the predetermined value and the automatic driving control becomes difficult.

SUMMARY

However, in addition to the point where the position detection accuracy reaches equal to or less than the predetermined value, there may be points where it is not desirable to continue the automatic driving control. Specifically, even when the position detection accuracy is greater than the predetermined value, at a point where another driver feels uneasy and switches to manual operation or another driver thinks that he/she wishes to perform manual operation, it is not desirable to continue automatic drive control.

A cancel point management system of the present invention includes a cancel point collector that collects first notification information, indicating a manual cancel point which is a point where automatic drive control has been cancelled in response to operation by a driver in a notification vehicle, from the notification vehicle, and a guide information distributer that distributes first guide information for showing the manual cancel point to a guide vehicle traveling on a road.

A non-transitory computer readable storage medium storing a cancel point management program of the present invention functions a computer as a cancel point collector that collects first notification information indicating a manual cancel point, which is a point where the automatic drive control has been cancelled in response to operation by a driver in a notification vehicle, from the notification vehicle, and a guide information distributer that distributes first guide information for showing the manual cancel point to a guide vehicle traveling on a road.

A cancel point notification system of the present invention includes a cancel detector that detects that automatic drive control has been cancelled in response to operation by a driver in a notification vehicle, and a notification information transmitter that transmits first notification information, indicating a manual cancel point which is a point where the automatic drive control has been cancelled in response to the operation by the driver, to a cancel point management system.

A cancel point guide system comprises a guide information receiver that receives first guide information, indicating a manual cancel point which is a point where automatic drive control has been cancelled in response to operation by a driver in a notification vehicle, from a cancel point management system, and a guide controller that shows the manual cancel point based on the first guide information.

DETAILED DESCRIPTION

The present invention provides a technique capable of providing a driver with an opportunity to decide whether or not to continue automatic drive control. The manual cancel point where the automatic drive control has been cancelled in response to the operation by the driver is a point where the driver has canceled the automatic drive control by his/her own decision. For example, the manual cancel point may be a point where another driver has felt uneasy about the automatic drive control, or a point where the driver wishes to perform manual driving. By showing such a manual cancel point to a driver in the guide vehicle, it is possible to provide the driver in the guide vehicle with an opportunity to decide whether or not to continue the automatic drive control.

According to the cancel point management system and the cancel point management program of the present invention, it is possible to collect the manual cancel point from the notification vehicle and to show the manual cancel point to the guide vehicle. According to the cancel point notification system of the present invention, the manual cancel point can be collected by the cancel point management system. According to the cancel point guide system, the manual cancel point can be shown to the guide vehicle.

The embodiments of the present invention will be described in the following order.
(1) Configuration of Vehicle System:
  (1-1) Configuration of Cancel Point Management System:
  (1-2) Configuration of In-Vehicle System (Cancel Point Notification System/Cancel Point Guide System):
(2) Processing of Vehicle System:
  (2-1) Cancel Point Notification Processing:
  (2-2) Cancel Point Management Processing:
  (2-3) Cancel Point Guide Processing:
(3) Other Embodiments:

(1) Configuration of Vehicle System

Figure 1:
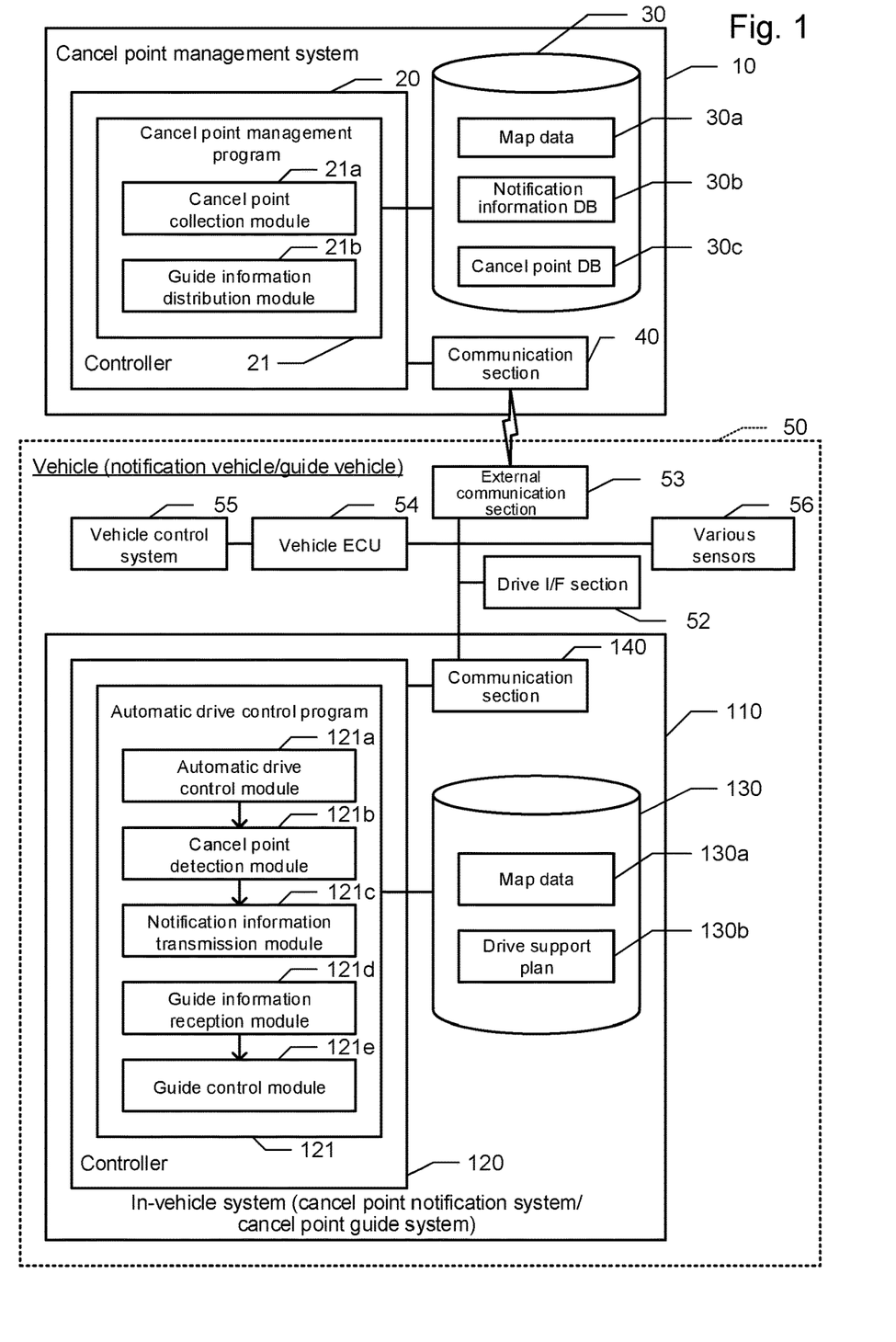
FIG. 1 is a block diagram of a vehicle system.

FIG. 1 is a block diagram of a vehicle system. The vehicle system is constituted of a cancel point management system 10 and an in-vehicle system 110, which can communicate with each other, and a vehicle 50. The cancel point management system 10 is a server. The in-vehicle system 110 is an in-vehicle device installed in the vehicle 50. Although not illustrated, the in-vehicle system 110 is installed in each of many of the vehicles 50, and each of the in-vehicle systems 110 can communicate with the cancel point management system 10. The vehicle 50 corresponds to both a notification vehicle and a guide vehicle according to the present invention.

(1-2) Configuration of Cancel Point Management System

The cancel point management system 10 includes a controller 20, a recording medium 30, and a communication section 40. The controller 20 includes a CPU, a RAM, a ROM, and the like and executes a cancel point management program 21 stored in the recording medium 30 or the ROM. The communication section 40 is a wireless communication circuit for performing wireless communication with the vehicle 50.

The recording medium 30 records map data 30a, a notification information DB (database) 30b, and a cancel point DB (database) 30c. The map data 30a includes node data, link data, and guide data. The node data mainly indicates information about intersections. Specifically, the node data indicates coordinates of a node corresponding to an intersection and the shape of the intersection. The link data indicates various pieces of information such as a section length, a travel time, and speed limit for a link corresponding to a road section. The road section is a unit of a road separated by intersections continuous in the length direction, and nodes exist at both ends of the link. A node to which three or more links are connected corresponds to an intersection.

The notification information DB 30b is a database that accumulates notification information transmitted from the vehicle 50 as the notification vehicle. The notification information is information indicating the type (manual/automatic) and the position for the cancel point. The cancel point is a point where the automatic drive control has been canceled in the vehicle 50 as the notification vehicle. The cancel point where the type is manual type is a manual cancel point, and the cancel point where the type is automatic type is an automatic cancel point. Details of the manual cancel point and the automatic cancel point will be described later.

The cancel point DB 30c is a database in which the position, the number of times of cancelling, and the type are recorded for each of a plurality of cancel points. The cancel point DB 30c is a database created by statistically processing the notification information accumulated in the notification information DB 30b. The number of times of cancelling is the number of times the automatic drive control has been cancelled at cancel points with the same positions and the same types. When the positions of the cancel points are the same, it means that the positions of the cancel points are within a predetermined distance (for example, 30 m). Even if the positions of the cancel points are the same, if the types are different, the cancel points are recorded as individual cancel points, and the number of times of cancelling is counted individually.

The cancel point management program 21 includes a cancel point collection module 21a and a guide information distribution module 21b. The cancel point collection module 21a and the guide information distribution module 21b are program modules that each cause the controller 20 as a computer to function as a cancel point collector and a guide information distributer.

The function of the cancel point collection module 21a causes the controller 20 to collect first notification information indicating the manual cancel point, which is a point where the automatic drive control has been cancelled in response to operation by a driver in the vehicle 50 as the notification vehicle, from the vehicle 50. Further, by the function of the cancel point collection module 21a, the controller 20 collects second notification information, indicating the automatic cancel point which is a point where by the state of the vehicle 50 as the notification vehicle no longer satisfying the conditions for performing the automatic drive control, the automatic drive control has been cancelled, from the vehicle 50.

That is, by the function of the cancel point collection module 21a, the controller 20 receives notification information, indicating the type (manual/automatic) and the position for the cancel point, from the vehicle 50 as the notification vehicle. The function of the cancel point collection module 21a causes the controller 20 to accumulate the notification information, received from many of the vehicles 50, in the notification information DB 30b. Here, the notification information about the cancel point where the type is the manual type corresponds to the first notification information, and the notification information about the cancel point where the type is the automatic type corresponds to the second notification information. The notification information may collectively indicate information about a plurality of the cancel points, and notification information indicating both the cancel point where the type is the manual type and the cancel point where the type is the automatic type corresponds to both the first notification information and the second notification information.

By the function of the guide information distribution module 21b, the controller 20 distributes first guide information for showing the manual cancel point to the vehicle 50 as the guide vehicle traveling on the road. By the function of the guide information distribution module 21b, the controller 20 statistically processes the notification information accumulated in the notification information DB 30b, thereby generating the cancel point DB 30c. That is, in the cancel point indicated by the notification information accumulated in the notification information DB 30b, if the position and the type are the same as those of the existing cancel point indicated by the cancel point DB 30c, the controller 20 adds 1 to the number of times of cancelling at the existing cancel point. Further, in the cancel point indicated by the notification information accumulated in the notification information DB 30b, if the position and the type are not the same as those of the existing cancel point indicated by the cancel point DB 30c, the controller 20 records the cancel point, indicated by the notification information and serving as a new cancel point, in the cancel point DB 30c. The number of times of cancelling at the cancel point newly to be recorded is one. When using the notification information for updating the cancel point DB 30c, the controller 20 deletes the notification information from the notification information DB 30b.

By the function of the guide information distribution module 21b, the controller 20 distributes, to the guide vehicle, the first guide information for showing the manual cancel point where the number of times of cancelling as the number of times the automatic drive control has been cancelled is not less than a first threshold value. By the function of the guide information distribution module 21b, the controller 20 extracts a manual cancel point where the number of times of cancelling is not less than the first threshold value from among the manual cancel points recorded in the cancel point DB 30c, and distributes the first guide information, indicating the position of the manual cancel point, to the vehicle 50 as the guide vehicle. The first threshold value may be a value set by a driver.

By the function of the guide information distribution module 21*b*, the controller 20 distributes second guide information for showing the automatic cancel point to the guide vehicle. Specifically, by the function of the guide information distribution module 21*b*, the controller 20 distributes, to the guide vehicle, the second guide information for showing the automatic cancel point where the number of times of cancelling as the number of times the automatic drive control has been cancelled is not less than a second threshold value different from the first threshold value. By the function of the guide information distribution module 21*b*, the controller 20 extracts an automatic cancel point where the number of times of cancelling is not less than the second threshold value from among the automatic cancel points recorded in the cancel point DB 30*c*, and distributes the second guide information, indicating the position of the automatic cancel point, to the vehicle 50 as the guide vehicle. The second threshold value is smaller than a setting range of the first threshold value and is a predetermined constant value.

By the function of the guide information distribution module 21*b*, the controller 20 generates guide information by integrating the first guide information and the second guide information, and distributes the guide information to the vehicle 50 as the guide vehicle. The guide information is information indicating the position of the manual cancel point and the position of the automatic cancel point. Of course, the first guide information and the second guide information may be transmitted individually.

(1-2) Configuration of In-Vehicle System (Cancel Point Notification System/Cancel Point Guide System)

The in-vehicle system 110 is installed in the vehicle 50. The vehicle 50 includes a drive I/F section 52, an external communication section 53, a vehicle ECU (Electronic Control Unit) 54, a vehicle control system 55, and various sensors 56. The drive I/F section 52 is a device that inputs operations relating to driving (including automatic drive control) and outputs information on driving, and includes various operation units such as a steering wheel, a pedal, and a shift lever and various output units such as a display and a speaker.

The external communication section 53 is a communication circuit for performing wireless communication with the cancel point management system 10. The vehicle ECU 54 is a computer for controlling the vehicle control system 55. During manual driving, the vehicle ECU 54 controls the vehicle control system 55 in accordance with operation on the drive I/F section 52. On the other hand, during automatic driving, the vehicle ECU 54 controls the vehicle control system 55 based on a command from the in-vehicle system 110. The vehicle control system 55 corresponds to various actuators for accelerating, decelerating and steering the vehicle 50.

The various sensors 56 are sensors for detecting the position of the vehicle 50, and are a GPS receiver, a vehicle speed sensor, a gyro sensor, an external camera, and the like. A current location of the vehicle 50 can be specified based on output signals of the GPS receiver, the vehicle speed sensor, and the gyro sensor. The in-vehicle system 110 performs route guidance based on the current location of the vehicle 50. In addition, the in-vehicle system 110 obtains a high-accuracy recognition position of the vehicle 50 by image recognition processing of a front landscape and a rear landscape of the vehicle 50 taken by the external camera. The in-vehicle system 110 performs automatic driving based on the high-accuracy recognition position.

The in-vehicle system 110 includes a controller 120, a recording medium 130, and a communication section 140. The controller 120 includes a CPU, a RAM, a ROM, and the like and executes an automatic drive control program 121 stored in the recording medium 130 or the ROM. The communication section 140 is a wired communication circuit for performing communication with the sections 52 to 56 of the vehicle 50. The communication section 140 may be a wireless communication circuit.

The recording medium 130 records map data 130*a* and a drive support plan 130*b*. The map data 130*a* is map data indicating intersections and shapes of road sections in more detail than the map data 30*a* of the cancel point management system 10. Specifically, the map data 130*a* includes lane structure data, lane shape data, road surface paint data, and the like. The lane structure data is data indicating the number of lanes, condition of addition of lanes near intersections, and the like for each road section. The lane shape data is data indicating the width of the lane, the length of the lane, and the like. The road surface paint data is data indicating the position and content of a paint formed on a road surface. The drive support plan 130*b* indicates time-series target positions set on a road and a target vehicle speed, a target acceleration/deceleration and a target steering angle at each target position.

The automatic drive control program 121 includes an automatic drive control module 121*a*, a cancel point detection module 121*b*, a notification information transmission module 121*c*, a guide information reception module 121*d*, and a guide control module 121*e*. The cancel point detection module 121*b* and the notification information transmission module 121*c* are program modules that each cause the controller 121 as a computer to function as a cancel point detection section and a notification information transmitter of the cancel point notification system. The guide information reception module 121*d* and the guide control module 121*e* are program modules that each cause the controller 120 as a computer to function as a guide information receiver and a guide controller of the cancel point guide system.

By the function of the automatic drive control module 121*a*, the controller 120 acquires the lane structure data and the lane shape data of a road section on a scheduled traveling route of the vehicle 50, and sets time-series target positions where the vehicle 50 travels in a road section on the scheduled traveling route based on the lane structure data and the lane shape data. The controller 120 sets the target vehicle speed, a target acceleration/deceleration and a target steering angle at each target position. The controller 120 creates the drive support plan 130*b* indicating the time-series target positions, the target vehicle speed, the target acceleration/deceleration and the target steering angle at each target position. For example, the scheduled traveling route is constituted by a series of road sections connecting from a departure point to a destination set by a driver, and may be searched by a known route search method. In addition to the in-vehicle system 110, the vehicle 50 may have a navigation system for searching and showing a scheduled traveling route.

By the function of the automatic drive control module 121*a*, the controller 120 feedback-controls the vehicle control system 55 so that the target vehicle speed, the target acceleration/deceleration and the target steering angle at each target position indicated by the drive support plan 130*b* can be realized. Specifically, the controller 120 acquires the high-accuracy recognition position of the vehicle 50 by image recognition processing of the front landscape and the rear landscape of the vehicle 50 taken by the external camera of the various sensors 56, and, at the same time, performs feedback control of the vehicle control system 55 such that the high-accuracy recognition position approaches the target position indicated by the drive support plan 130b. Similarly, the controller 120 feedback-controls the vehicle control system 55 such that an actual acceleration/deceleration and an actual steering angle approach the target acceleration/deceleration and the target steering angle indicated by the drive support plan 130b. The controller 120 realizes the automatic drive control by outputting control data, indicating a control amount of the feedback control in the vehicle control system 55, to the vehicle ECU 54.

By the function of the automatic drive control module 121a, the controller 120 cancels the automatic drive control when the state of the vehicle 50 no longer satisfies continuation conditions during the automatic drive control. In this embodiment, the continuation conditions are satisfied when reliability of the high-accuracy recognition position is not less than the threshold value. In this embodiment, when a lane on which a vehicle is traveling can be uniquely specified by the image recognition processing of the front landscape and the rear landscape, the controller 120 sets the reliability of the high-accuracy recognition position to not less than the threshold value, and when the lane on which the vehicle is traveling cannot be uniquely specified, the controller 120 sets the reliability of the high-accuracy recognition position to less than the threshold value. The continuation condition is merely an example, and other conditions may be applied as continuation conditions.

In addition, the function of the automatic drive control module 121a causes the controller 120 to cancel the automatic drive control when a predetermined cancel operation is accepted to the operation I/F section 52 during the automatic drive control. The cancel operation may mean that a dedicated operation section (a switch on a touch panel, a mechanical switch, or the like) provided as the drive I/F section 52 is operated. Further, the cancel operation may mean that operation sections (a steering wheel, a pedal, a shift lever, and the like) for manual driving provided as the drive I/F section 52 are operated during the automatic drive control.

Hereinafter, a case where the in-vehicle system 110 behaves as a cancel point notification system and the vehicle 50 behaves as a notification vehicle will be described. The function of the cancel point detection module 121b causes the controller 120 to detect that the automatic drive control has been cancelled in response to operation by a driver in the vehicle 50 as the notification vehicle. That is, by the function of the cancel point detection module 121b, the controller 120 detects that the cancel operation is accepted in the drive I/F section 52. Further, the function of the cancel point detection module 121b causes the controller 120 to detect that the state of the vehicle 50 as the notification vehicle no longer satisfies the continuation conditions for performing the automatic drive control.

The function of the notification information transmission module 121c causes the controller 120 to transmit, to the cancel point management system 10, the first notification information indicating the manual cancel point which is a point where the automatic drive control has been cancelled in response to operation by a driver. That is, by the function of the notification information transmission module 121c, the controller 120 transmits the first notification information, indicating, as a position of a cancel point, a position of a current location of the vehicle 50 as the notification vehicle when the cancel operation is accepted, and, in addition, indicating the manual operation as the type of the cancel point, to the cancel point management system 10.

By the function of the notification information transmission module 121c, the controller 20 transmits, to the cancel point management system 10, the second notification information indicating the automatic cancel point which is a point where by the state of the vehicle 50 as the notification vehicle no longer satisfying the continuation conditions for performing the automatic drive control, the automatic drive control has been cancelled. That is, the function of the notification information transmission module 121c causes the controller 120 to transmits the second notification information, indicating, as the position of the cancel point, the position of the current location of the vehicle 50 as the notification vehicle when the reliability of the high-accuracy recognition position has reached less than the threshold value, and, in addition, indicating the automatic operation as the type of the cancel point, to the cancel point management system 10.

Hereinafter, a case where the in-vehicle system 110 behaves as the cancel point guide system and the vehicle 50 behaves as a guide vehicle will be described. The function of the guide information reception module 121d causes the controller 120 to receive, from the cancel point management system 10, the first guide information indicating the manual cancel point which is the point where the automatic drive control has been cancelled in response to operation by a driver in the notification vehicle. Further, by the function of the guide information reception module 121d, the controller 20 receives, from the cancel point management system 10, the second guide information indicating the automatic cancel point which is the point where by the state of the vehicle 50 as the notification vehicle no longer satisfying the continuation conditions for performing the automatic drive control, the automatic drive control has been cancelled. In this embodiment, the controller 120 does not individually receive the first guide information and the second guide information, but receives guide information in which the first guide information and the second guide information are integrated from the cancel point management system 10.

The function of the guide control module 121e causes the controller 120 to show the manual cancel point based on the first guide information. Specifically, when the vehicle 50 as the guide vehicle is approaching any of the manual cancel points indicated by the guide information, the controller 120 causes a speaker as the drive I/F section 52 to output a guide message for showing the manual cancel point. In this embodiment, the case where the vehicle 50 is approaching the cancel point means that the cancel point on the scheduled traveling route exists in front of the vehicle 50 and a distance between the cancel point and the vehicle 50 is within a determination distance (for example, 50 m).

Further, the function of the guide control module 121e causes the controller 120 to show the automatic cancel point based on the second guide information. When the vehicle 50 as the guide vehicle is approaching any of the automatic cancel points indicated by the guide information, the controller 120 causes a speaker as the drive I/F section 52 to output a guide message for showing the automatic cancel point.

Here, the function of the guide control module 121e causes the controller 120 to show the automatic cancel point more emphatically than the manual cancel point. Specifically, the controller 120 outputs a guide message (for example, "Recommended to switch to manual driving") suggesting switching to the manual driving for the manual cancel point and outputs a guide message (for example, "Please perform manual driving") notifying the switching to the manual driving with a warning sound for the automatic cancel point.

According to the cancel point management system 10 of this embodiment described above, it is possible to collect the manual cancel point from the notification vehicle and to show the manual cancel point to the guide vehicle. In addition, according to the in-vehicle system 110 as the cancel point notification system of this embodiment, the manual cancel point can be collected by the cancel point management system 10. According to the in-vehicle system 110 as the cancel point guide system of this embodiment, it is possible to show the manual cancel point where another driver has felt uneasy about the automatic drive control, or another driver has wished to perform manual driving, to the guide vehicle. By showing such a manual cancel point to a driver in the guide vehicle, it is possible to provide the driver in the guide vehicle with an opportunity to decide whether or not to continue the automatic driving.

The cancel point management system 10 collects the second notification information, indicating the automatic cancel point which is a point where by the state of the vehicle 50 as the notification vehicle no longer satisfying the conditions for performing the automatic drive control, the automatic drive control has been cancelled, from the vehicle 50. As a result, it is possible to show not only the manual cancel point where the automatic drive control has been canceled in response to the operation by the driver but also the automatic cancel point where the automatic drive control has been automatically canceled.

The cancel point management system 10 distributes, to the guide vehicle, the first guide information for showing the manual cancel point where the number of times of cancelling as the number of times the automatic drive control has been cancelled is not less than the first threshold value and distributes, to the guide vehicle, the second guide information for showing the automatic cancel point where the number of times of cancelling as the number of times the automatic drive control has been cancelled is not less than the second threshold value different from the first threshold value. As a result, the easiness of guidance can be made different between the manual cancel point and the automatic cancel point. As in this embodiment, when the first threshold value is set to more than the second threshold value, it is possible to realize guidance suitable for a driver in the guide vehicle who has a strong tendency to wish to continue the automatic drive control as much as possible.

Here, the extent to which it is desired to switch the automatic driving to the manual driving at the manual cancel point depends on the driver. Accordingly, there is a case that the driver in the guide vehicle does not feel like switching the automatic driving to the manual driving at the manual cancel point where a driver in a certain notification vehicle felt like switching the automatic driving to the manual driving. Thus, the manual cancel point is not emphatically shown (switching to the manual driving is only suggested), so that it is possible to prevent the automatic drive control from being cancelled unnecessarily.

(2) Processing of Vehicle System

Next, processing executed by the cancel point management system 10 and processing executed by the in-vehicle system 110 will be described. Specifically, cancel point notification processing executed by the in-vehicle system 110 as the cancel point notification system, cancel point management processing executed by the cancel point management system 10, and cancel point guide processing executed by the in-vehicle system 110 as the cancel point guide system will be described in order.

(2-1) Cancel Point Notification Processing

Figure 2:
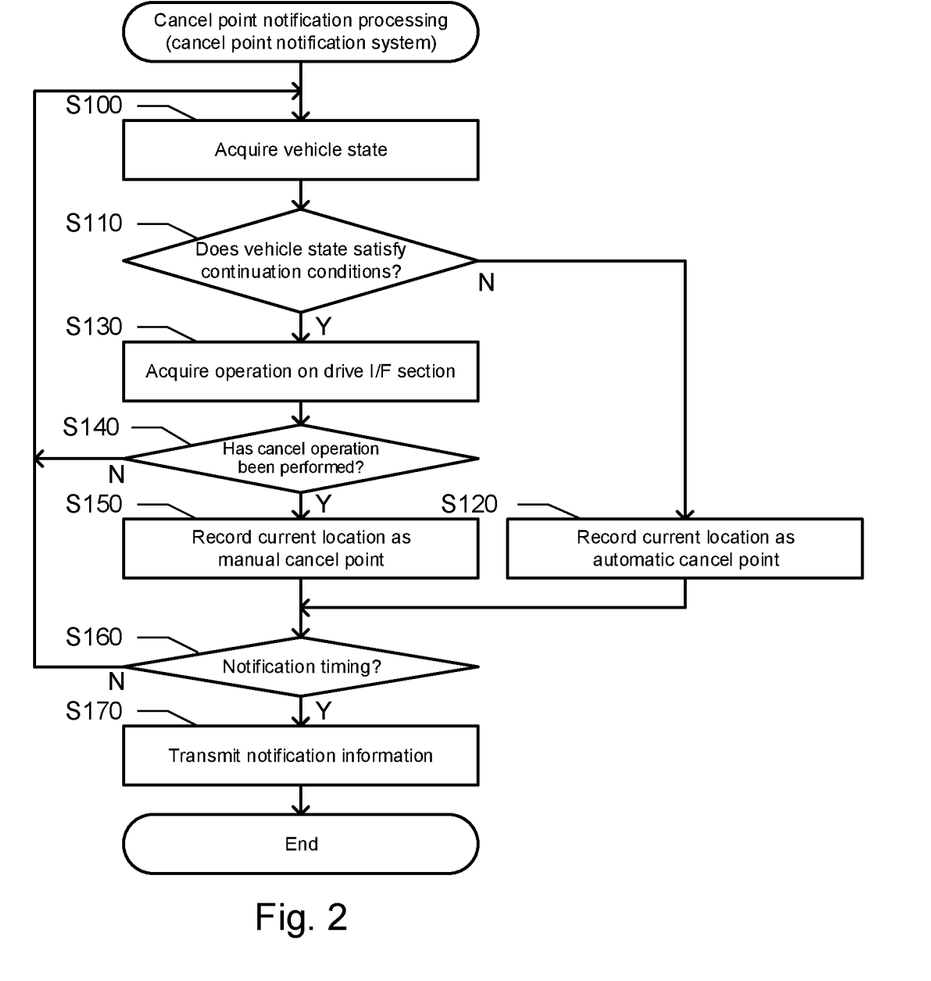
FIG. 2 is a flowchart of a cancel point notification processing.

FIG. 2 is a flowchart of the cancel point notification processing. The cancel point notification processing is processing that is always executed in the notification vehicle that is executing the automatic drive control. First, the function of the cancel point detection module 121b causes the controller 120 of the in-vehicle system 110 to acquire the state of the vehicle 50 (step S100). Specifically, the controller 120 acquires the reliability of the high-accuracy recognition position (whether or not the lane on which the vehicle is traveling can be uniquely specified) as the state of the vehicle 50.

Then, the function of the cancel point detection module 121b causes the controller 120 of the in-vehicle system 110 to determine whether or not the state of the vehicle 50 satisfies the continuation conditions (step S110). That is, the controller 120 of the in-vehicle system 110 determines whether or not the lane on which the vehicle is traveling can be uniquely specified and whether or not the reliability of the high-accuracy recognition position is not less than the threshold value.

When it is determined that the state of the vehicle 50 does not satisfy the continuation conditions (step S110: N), the function of the cancel point detection module 121b causes the controller 120 to record a current location of the vehicle 50 as the automatic cancel point (step S120). That is, the controller 120 records, in the recording medium 130, the position of the current location of the vehicle 50 at a point of time at which the state of the vehicle 50 does not satisfy the continuation conditions, as the position of the cancel point where the type is the automatic type.

On the other hand, when it is determined that the state of the vehicle 50 satisfies the continuation conditions (step S110: Y), the function of the cancel point detection module 121b causes the controller 120 to acquire the operation on the drive I/F section 52 (step S130). Then, the function of the cancel point detection module 121b causes the controller 120 to determine whether or not the cancel operation has been performed (step S140). That is, the controller 120 determines whether or not cancel operation for canceling the automatic drive control has been accepted in the drive I/F section 52.

When it is determined that the cancel operation has been performed (step S140: Y), the function of the cancel point detection module 121b causes the controller 120 to record the current location as the manual cancel point (step S120). That is, the controller 120 records, in the recording medium 130, the position of the current location of the vehicle 50 at a point of time at which the cancel operation has been performed, as the position of the cancel point where the type is the manual type.

When the cancel point is recorded in the recording medium 130 in step S120 or S150, the function of the notification information transmission module 121c causes the controller 120 to determine whether or not a notification timing is reached (step S160). That is, the controller 120 determines whether or not the present time is the notification timing when notification information should be transmitted to the cancel point management system 10. In this embodiment, it is assumed that the notification timing is immediately after detection of the cancel point. Thus, when step S120 or S150 is executed, the determination result of step S160 is definitely "Yes".

When it is determined that the notification timing is reached (step S160: Y), the function of the notification information transmission module 121c causes the controller 120 to transmit the notification information (step S170). That is, the controller 120 generates the notification information indicating the position and type of the cancel point recorded in the recording medium 130 and transmits the notification information to the cancel point management system 10. Immediately after execution of step S120, the second notification information indicating the automatic cancel point is transmitted to the cancel point management system 10. Immediately after execution of step S150, the first notification information indicating the manual cancel point is transmitted to the cancel point management system 10.

The notification timing in step S160 is not necessarily immediately after detection of the cancel point and may be, for example, a timing when the vehicle 50 is parked or a timing when the power supply of the in-vehicle system 110 is turned on or off. In this case, the determination result of step S160 may be "No". If the determination result of step S160 is "No", the controller 120 returns to step S100 while holding the cancel point recorded in the recording medium 130 in step S120 or S150. As a result, the controller 120 can accumulate the cancel point in the recording medium 130 until the notification timing arrives.

When the notification timing arrives, the function of the notification information transmission module 121c causes the controller 120 to generate notification information indicating each cancel point accumulated in the recording medium 130 and transmit the notification information to the cancel point management system 10. When at least one manual cancel point is included in the cancel point accumulated in the recording medium 130, the notification information corresponding to the first notification information is generated. On the other hand, when at least one automatic cancel point is included in the cancel point accumulated in the recording medium 130, the notification information corresponding to the second notification information is generated. When at least one manual cancel point and at least one automatic cancel point are included in the cancel points accumulated in the recording medium 130, notification information corresponding to both the first notification information and the second notification information is generated.

In step S140, when it is determined that there has been no cancel operation, the controller 120 returns to step S100. In other words, when the cancel point has not been detected, the processing from steps S100 to S140 is repeatedly executed until the cancel point is detected.

(2-2) Cancel Point Management Processing

Figure 3A:
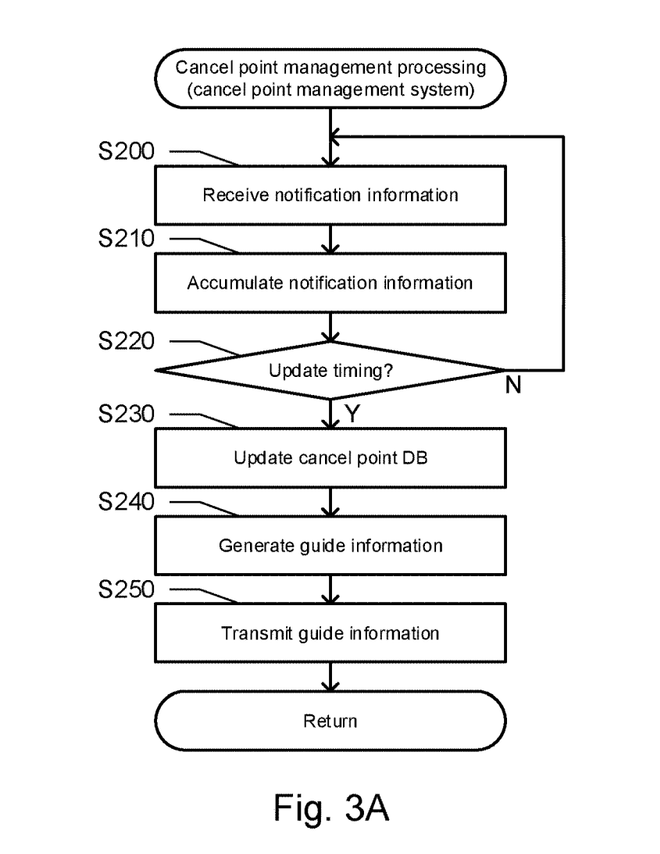
FIG. 3A is a flowchart of a cancel point management processing.

FIG. 3A is a flowchart of the cancel point management processing. The cancel point management processing is processing that is always executed in the cancel point management system 10. First, the function of the cancel point collection module 21a causes the controller 20 to receive the notification information (step S200). That is, the controller 20 receives notification information, indicating at least one of the manual cancel point and the automatic cancel point, from the vehicle 50 as a providing vehicle. Next, the function of the cancel point collection module 21a causes the controller 20 to accumulate the notification information (step S210). That is, the controller 20 accumulates the received notification information in the notification information DB 30b. As a result, many cancel points can be collected.

Then, the function of the guide information distribution module 21b causes the controller 20 to determine whether or not an update timing is reached (step S220). That is, the controller 20 determines whether or not the present time is the update timing when the cancel point DB 30c should be updated. The update timing may be, for example, timing of each elapse of a certain period, or may be timing of each reach of the number of cancel points, indicated by the notification information accumulated in the notification information DB 30b, to a certain number.

When it is determined that the update timing is not reached (step S220: N), the controller 20 returns to step S200 and repeatedly executes the processing of accumulating the notification information. On the other hand, when it is determined that the update timing is reached (step S220: Y), the function of the guide information distribution module 21b causes the controller 20 to update the cancel point DB 30c. Specifically, in the cancel point indicated by the notification information accumulated in the notification information DB 30b, if the position and the type are the same as those of the existing cancel point indicated by the cancel point DB 30c, the controller 20 adds 1 to the number of times of cancelling at the existing cancel point. Further, in the cancel point indicated by the notification information accumulated in the notification information DB 30b, if at least one of the position and the type is not the same as those of the existing cancel point indicated by the cancel point DB 30c, the controller 20 records the cancel point, indicated by the notification information and serving as a new cancel point, in the cancel point DB 30c.

When the cancel point DB 30c is updated as described above, the function of the guide information distribution module 21b causes the controller 20 to generate the guide information (step S240). That is, the controller 20 generates the first guide information for showing the manual cancel point where the number of times of cancelling is not less than the first threshold value among the manual cancel points indicated by the cancel point DB 30c and the second guide information for showing the automatic cancel point where the number of times of cancelling is not less than the second threshold value among the automatic cancel points indicated by the cancel point DB 30c. Then, the function of the guide information distribution module 21b causes the controller 20 to generate the guide information by integrating the first guide information and the second guide information. The controller 20 may generate the guide information for showing the cancel point existing in a region where the guide vehicle as a distribution destination is highly likely to travel. For example, the controller 20 may generate guide information for showing the cancel point existing within a predetermined distance from the guide vehicle as the distribution destination. And the controller 20 may generate guide information for showing the cancel point on a scheduled traveling route of the guide vehicle as the distribution destination.

Finally, the function of the guide information distribution module 21b causes the controller 20 to transmit the guide information (step S250). That is, the controller 20 distributes the guide information to the vehicle 50 as the guide vehicle. As a result, the guide information reflecting the update of the cancel point DB 30c can be distributed to the vehicle 50 as the guide vehicle. The guide information is not necessarily distributed at the update timing of the cancel point DB 30c.

For example, the controller 20 may distribute the guide information for showing the cancel point on the scheduled traveling route of the vehicle 50, to the vehicle 50 at a timing when the vehicle 50 starts the automatic drive control.

(2-3) Cancel Point Guide Processing

Figure 3B:
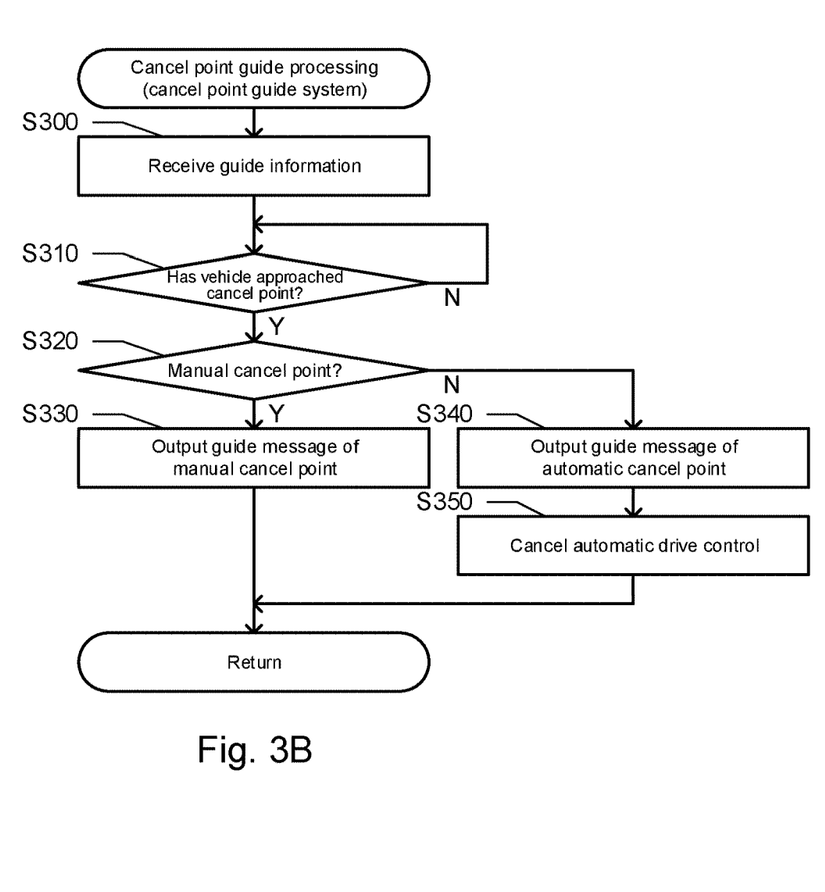
FIG. 3B is a flowchart of a cancel point guide processing.

FIG. 3B is a flowchart of the cancel point guide processing. The cancel point guide processing is processing that is always executed in the guide vehicle that is executing the automatic drive control. First, the function of the guide information reception module 121d causes the controller 120 to receive the guide information (step S300). That is, the controller 120 receives the guide information in which the first guide information and the second guide information are integrated, and records the guide information (not shown) in the recording medium 130.

Then, the function of the guide control module 121e causes the controller 120 to determine whether or not the vehicle has approached the cancel point (step S310). Specifically, the case where the cancel point on the scheduled traveling route exists in front of the vehicle 50 and the distance between the cancel point and the vehicle 50 is within a determination distance (for example, 50 m), the controller 120 determines that the vehicle 50 has approached the cancel point.

When it is determined that the vehicle has not approached the cancel point (step S310: N), the function of the guide control module 121e causes the controller 120 to return to step S310 and wait until the vehicle approaches the cancel point. On the other hand, when it is determined that the vehicle has approached the cancel point (step S310: Y), the function of the guide control module 121e causes the controller 120 to determine whether or not the cancel point is the manual cancel point (step S320). That is, the controller 120 determines whether or not the type of the cancel point where the vehicle is approaching is the manual type.

When it is determined that the cancel point is the manual cancel point (step S320: Y), the function of the guide control module 121e causes the controller 120 to output a guide message of the manual cancel point (step S330). For example, the controller 120 outputs a guide message (for example, "Recommended to switch to manual driving") suggesting switching to the manual driving.

On the other hand, when it is determined that the cancel point is not the manual cancel point (step S320: N), the function of the guide control module 121e causes the controller 120 to output a guide message of the automatic cancel point (step S340). For example, the controller 120 outputs a guide message (for example, "Please perform manual driving") notifying switching to the manual driving with a warning sound. Then, the function of the automatic drive control module 121a causes the controller 120 to cancel the automatic drive control (step S350). The cancellation of the automatic drive control in step S350 is not a target of notification by the notification information.

(3) Other Embodiments

In the above embodiment, the second threshold value for determining whether or not to set the automatic cancel point as a guide target is set to be smaller than the first threshold value for determining whether or not to set the manual cancel point as the guide target. However, the second threshold value may be set to a larger value. Obviously, the first threshold value and the second threshold value may be the same value. As with the first threshold value, the second threshold value may be settable by a driver, or as with the second threshold value, the first threshold value may be non-settable by the driver.

In this invention, at least the manual cancel point may be shown, and the processing related to the automatic cancel point in the first embodiment may be omitted. For example, the automatic cancel point may not be set as a guide target, and the controller 120 may forcibly switch the automatic driving to the manual driving. The guide messages of the automatic cancel point and the manual cancel point are not necessarily different from each other, and the guide messages of the automatic cancel point and the manual cancel point may be the same. In addition, the automatic cancel point and the manual cancel point may be shown by images, and may be shown by a marker on a map, for example.

The notification vehicle and the guide vehicle may be vehicles which can be automatically driven and controlled and, in addition, can be manually driven by a driver, and both the function of notifying the manual cancel point and the function of showing the manual cancel point may be realized in a single vehicle. That is, a single vehicle may correspond to both the notification vehicle and the guide vehicle. Further, the cancel point notification system for notifying the manual cancel point and the cancel point guide system for showing the manual cancel point may be realized by a single apparatus. The automatic drive control may mean that acceleration or deceleration is automatically controlled, or that steering is automatically controlled. Accordingly, the manual cancel point may be a point where the automatic control of acceleration or deceleration is canceled, a point where the automatic control of steering is cancelled, or a point where the automatic control of both acceleration and deceleration and steering is canceled.

The operation by a driver may operation of a dedicated operation section for accepting operation for cancelling the automatic drive control or operation of operation sections (a steering wheel, a pedal, a lever, and the like) for the manual driving. The operation for canceling the automatic drive control may be operation accepted by voice recognition or operation accepted by image recognition.

The cancel point collector may collect the first notification information from the notification vehicle and may collect the first notification information from many notification vehicles in order to collect much first notification information. The cancel point collector may collect the first notification information each time the automatic drive control is canceled in response to the operation by a driver or may collect the first notification information every fixed period or each time the notification vehicle is parked, for example.

The guide information distributer may distribute the first guide information to any one of the guide vehicles and may narrow down the guide vehicles as distribution targets. For example, the guide information distributer may distribute the first guide information for showing the manual cancel point to the guide vehicle scheduled to travel at the manual cancel point and the guide vehicle whose distance to the manual cancel point is not more than the threshold value. For example, the guide information distributer may distribute the first guide information to the guide vehicle similar to the notification vehicle which has transmitted the first notification information. The fact that the notification vehicle and the guide vehicle are similar may mean that the sex, age, driving history, etc. of a driver in the notification vehicle are similar to those of a driver in the guide vehicle or that the body shape and the vehicle type of the notification vehicle are similar to those of the guide vehicle. Obviously, the guide information distributer may distribute the first guide information to all the guide vehicles regardless of a positional relationship between the guide vehicle and the manual cancel point.

The cancel point collector may collect the second notification information, indicating the automatic cancel point which is the point where by the state of the notification vehicle no longer satisfying the conditions for performing the automatic drive control, the automatic drive control has been cancelled, from the notification vehicle, and the guide information distributer may distribute the second guide information for showing the automatic cancel point to the guide vehicle. As a result, it is possible to show not only the manual cancel point where the automatic drive control has been canceled in response to the operation by the driver but also the automatic cancel point where the automatic drive control has been automatically canceled. The state of the notification vehicle may be the state of the notification vehicle itself or the state of the environment of the notification vehicle. For example, the state of the notification vehicle may be a motion state (acceleration/deceleration, angular acceleration, speed) of the notification vehicle, or may be an operating state (presence or absence of failure) of parts constituting the notification vehicle. The state of the notification vehicle may correspond to states of various pieces of information processing which is being performed for the automatic drive control of the notification vehicle. Specifically, the state of the notification vehicle may be the reliability of a current location in processing of specifying the current location of the notification vehicle. In addition, the state of the environment of the notification vehicle may be a weather condition such as weather or air temperature, or a state of a road such as a traffic jam situation.

In the guide vehicle, the automatic cancel point may be more emphatically shown than the manual cancel point. Here, the extent to which it is desired to switch the automatic driving to the manual driving at the manual cancel point depends on the driver. Accordingly, there is a case that the driver in the guide vehicle does not feel like switching the automatic driving to the manual driving at the manual cancel point where a driver in a certain notification vehicle felt like switching the automatic driving to the manual driving. Thus, the manual cancel point is not emphatically shown, so that it is possible to prevent the automatic drive control from being cancelled unnecessarily. To emphatically show may be to display or output by voice a message strongly urging a driver to switch the automatic driving to the manual driving. Further, to emphatically show may be to forcibly switch the automatic driving to the manual driving.

The guide information distributer distributes, to the guide vehicle, the first guide information for showing the manual cancel point where the number of times the automatic drive control has been cancelled or the probability is not less than the first threshold value and distributes, to the guide vehicle, the second guide information for showing the automatic cancel point where the number of times the automatic drive control has been cancelled or the probability is not less than the second threshold value different from the first threshold value. As a result, the easiness of guidance can be made different between the manual cancel point and the automatic cancel point. For example, when the first threshold value is set to be larger than the second threshold value, it is possible to realize guidance that does not cause annoyance to a driver in the guide vehicle who has a strong tendency to wish to continue the automatic drive control as much as possible. On the contrary, when the first threshold value is set to be smaller than the second threshold value, it is possible to realize guidance suitable for a driver in the guide vehicle who has a strong tendency to positively wish to switch the automatic driving to the manual driving.

As in the present invention, the method of managing the point where the automatic drive control has been canceled in response to the operation by a driver may be applied as a program or a method. Also, the system, program, or method as described above may be achieved as a single device or may be achieved using parts common to respective units provided in the vehicle, and thus include various aspects. For example, it is possible to provide a navigation system, a cancel point management system, a method, and a program including the apparatus as described above. Further, the present invention may be modified appropriately, for example, a part is designed to be software and a part is designed to be hardware. Furthermore, the present invention is also effective as a recording medium of a program controlling the apparatus. Of course, the recording medium of software may be either a magnetic recording medium or a magneto-optical recording medium, and any recording medium which will be developed in the future can be considered in exactly the same way.

What is claimed is:

1. A cancel point management system comprising:
   a cancel point collector programmed to:
      collect notification information from a notification vehicle having automatic drive control;
      determine, based on the notification information indicating the automatic drive control has been cancelled, when continuation conditions for performing the automatic drive control are satisfied, in response to operation by a driver in the notification vehicle, that the notification is a manual cancel point; and
      determine, based on the notification information indicating the automatic drive control has been canceled when the continuation conditions for performing the automatic drive control are no longer satisfied, that the notification is an automatic cancel point; and
   a guide information distributer programmed to:
      distribute, based on the notification being the manual cancel point, first guide information for showing the manual cancel point to a guide vehicle traveling on a road; and
      distribute, based on the notification being the automatic cancel point, second guide information for showing the automatic cancel point to the guide vehicle.

2. A non-transitory computer readable storage medium storing a cancel point management program that, when executed by the computer, causing the computer to function as:
   a cancel point collector programmed to:
      collect notification information from a notification vehicle capable of automatic drive control;
      determine, based on the notification information indicating the automatic drive control has been cancelled, when continuation conditions for performing the automatic drive control are satisfied, in response to operation by a driver in the notification vehicle, that the notification is a manual cancel point; and
      determine, based on the notification information indicating the automatic drive control has been canceled when the continuation conditions for performing the automatic drive control are no longer satisfied, that the notification is an automatic cancel point, and
   a guide information distributer programmed to:

distribute, based on the notification being the manual cancel point, first guide information for showing the manual cancel point to a guide vehicle traveling on a road; and distribute, based on the notification being the automatic cancel point, second guide information for showing the automatic cancel point to the guide vehicle.

3. The cancel point management system according to claim 2, wherein in the guide vehicle, the automatic cancel point is more emphatically shown than the manual cancel point.

4. The cancel point management system according to claim 1, wherein the guide information distributer is further programmed to:

distribute, to the guide vehicle, the first guide information for showing the manual cancel point where a number of times the automatic drive control has been cancelled or a probability is equal to or greater than a first threshold value, and distribute, to the guide vehicle, the second guide information for showing the automatic cancel point where a number of times the automatic drive control has been cancelled or a probability is equal to or greater than a second threshold value different from the first threshold value.

5. A cancel point notification system comprising:
a cancel detector programmed to:
  detect, based on an automatic drive control of a notification vehicle being cancelled in response to an operation of a driver in the notification vehicle when continuation conditions for performing the automatic drive control are satisfied, a manual cancel point; and
  detect, based on the automatic drive control of the vehicle being cancelled in response to an operation of the vehicle due to continuation conditions for performing the automatic drive control no longer being satisfied, an automatic cancel point;
a notification information transmitter programmed to:
  transmit, based on detecting the manual cancel point, first notification information to a cancel point management system, the first notification information indicating the manual cancel; and
  transmit, based on detecting the automatic cancel point, second notification information to the cancel point management system, the second notification information indicating the automatic cancel point.

6. A cancel point guide system comprising:
a guide information receiver programmed to:
  receive first guide information from a cancel point management system, the first guide information indicating a manual cancel point which is a point where automatic drive control of a notification vehicle has been cancelled, when continuation conditions for performing the automatic drive control are satisfied, in response to operation by a driver in the notification vehicle; and
  receive second guide information from a cancel point management system, the second guide information indicating an automatic cancel point which is a point where the automatic drive control of vehicle has been cancelled when the continuation conditions for performing the automatic drive control are no longer satisfied; and
a guide controller programmed to:
  control a display to display, based on receiving the first guide information, the manual cancel point; and
  control the display to display, based on receiving the second guide information, the automatic cancel point.

* * * * *